United States Patent
Heinze et al.

(10) Patent No.: US 9,604,604 B2
(45) Date of Patent: Mar. 28, 2017

(54) VEHICLE WASHING INSTALLATION

(71) Applicant: Alfred Kärcher GmbH & Co. KG, Winnenden (DE)

(72) Inventors: Michael Heinze, Hemmingen (DE); Ingo Feistkorn, Friedelsheim (DE); Yann Veitz, Vaihingen/Enz (DE); Claus Heid, Stuttgart (DE); André Speckmaier, Wuestenrot (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 670 days.

(21) Appl. No.: 14/161,815

(22) Filed: Jan. 23, 2014

(65) Prior Publication Data
US 2014/0130835 A1 May 15, 2014

Related U.S. Application Data

(63) Continuation of application No. PCT/EP2011/062951, filed on Jul. 27, 2011.

(51) Int. Cl.
*B05B 1/20* (2006.01)
*B08B 3/02* (2006.01)
*B60S 1/52* (2006.01)
*B60S 3/04* (2006.01)

(52) U.S. Cl.
CPC ...... *B60S 3/04* (2013.01); *B05B 1/20* (2013.01); *B08B 3/024* (2013.01); *B60S 1/528* (2013.01)

(58) Field of Classification Search
CPC . B05B 1/20; B08B 3/024; B60S 1/528; B60S 3/04

USPC .................. 134/45, 56 R, 123, 172, 180, 198
See application file for complete search history.

(56) References Cited

U.S. PATENT DOCUMENTS

| 4,856,543 A * | 8/1989 | Petit .......................... B60S 3/042 134/123 |
|---|---|---|
| 6,679,275 B2 | 1/2004 | Heinze et al. |
| 2004/0065349 A1 | 4/2004 | Scheiter, Jr. |
| 2008/0304988 A1 | 12/2008 | Asaka |
| 2010/0206961 A1 | 8/2010 | Turner |

FOREIGN PATENT DOCUMENTS

| CN | 101423051 | 5/2009 |
|---|---|---|
| DE | 10 2006 027 308 | 12/2007 |
| FR | 2 765 538 | 1/1999 |

\* cited by examiner

*Primary Examiner* — Michael Barr
*Assistant Examiner* — Levon J Shahinian
(74) *Attorney, Agent, or Firm* — Womble Carlyle Sandridge & Rice LLP

(57) ABSTRACT

A vehicle washing installation having two stands on which a nozzle beam with a plurality of high-pressure nozzles is held so as be adjustable in height is provided. The nozzle beam is surrounded by a protective body extending along the nozzle beam and having at least one outlet opening for cleaning liquid, the protective body being adjustable in height together with the nozzle beam and being movable relative to the nozzle beam upon striking an obstacle, the movement of the protective body relative to the nozzle beam being detectable by a sensor assembly in order to provide a control signal.

16 Claims, 6 Drawing Sheets

VEHICLE WASHING INSTALLATION

CROSS-REFERENCE TO RELATED APPLICATIONS

This application is a continuation of international application number PCT/EP2011/062951, filed on Jul. 27, 2011 which is incorporated herein by reference in its entirety and for all purposes.

BACKGROUND OF THE INVENTION

The invention relates to a vehicle washing installation having two stands on which a nozzle beam with a plurality of high-pressure nozzles is held so as to be adjustable in height.

Such vehicle washing installations are used, in particular, for commercial vehicles, for example, for trucks and special-purpose vehicles. By means of high-pressure nozzles which can be acted upon with a cleaning liquid under pressure, for example, with water, cleaning liquid under pressure can be directed toward the vehicles. The high-pressure nozzles may be constructed as flat jet nozzles or spot jet nozzles, for example, or also as spray nozzles. The nozzle beam is held in a height-adjustable manner on the stands so that it can follow the contour of a vehicle to be cleaned and can assume a short distance from the vehicle. The cleaning effect is thereby increased.

It may be provided that the vehicle is movable relative to the vehicle washing installation. Alternatively, it may be provided that the vehicle washing installation can be moved relative to the standing vehicle. In particular, it may be provided that the vehicle washing installation is configured in the form of a gantry washing installation comprising two stands rigidly connected to each other by a crossbar.

While the vehicle is being cleaned, care must be taken to ensure that the height-adjustable nozzle beam does not collide with parts of the vehicle. A light barrier arranged in front of the nozzle beam in the direction of adjustment of the nozzle beam is normally used for this purpose. The light barrier is aligned transversely to the longitudinal direction of the vehicle. If the light barrier is interrupted, the movement of the nozzle beam is stopped in order to avoid damage to the nozzle beam and, above all, damage to the vehicle. However, such light barriers have the disadvantage that vehicle parts permeable to radiation cannot be recognized. Also vehicle parts or vehicle structures which only interrupt the light barrier for a very short time can only be inadequately recognized in many cases. When construction vehicles are cleaned by the vehicle washing installation, there is a danger that, for example, grid structures of the vehicle or also a handle of a shovel inadvertently left on the vehicle and protruding from the vehicle will not be recognized by the light barrier and the nozzle beam will, therefore, collide with the grid-type structure or the handle of the shovel.

The object of the present invention is to so develop a vehicle washing installation of the kind mentioned at the outset that the danger of a collision of the nozzle beam with an obstacle can be reduced.

SUMMARY OF THE INVENTION

This object is accomplished, in accordance with the invention, in a generic vehicle washing installation in that the nozzle beam is surrounded by a protective body extending along the nozzle beam and having at least one outlet opening for cleaning liquid, the protective body being adjustable in height together with the nozzle beam and being movable out of a normal position relative to the nozzle beam upon striking an obstacle, the movement of the protective body relative to the nozzle beam being detectable by a sensor assembly in order to provide a control signal.

In the vehicle washing installation in accordance with the invention, the nozzle beam is surrounded by a protective body. The protective body surrounds the nozzle beam in the circumferential direction, and it has an outlet opening, so that the cleaning liquid emitted by the high-pressure nozzles of the nozzle beam can exit from the protective body and hit the vehicle surface to be cleaned. The protective body is adjustable in height together with the nozzle beam. The protective body can, therefore, be moved in the same way as the nozzle beam. The nozzle beam is arranged inside the protective body. If the nozzle beam approaches an obstacle, for example, a vehicle structure, in an inadmissible way, the protective body strikes the obstacle before the nozzle beam reaches the obstacle. The protective body is thereby moved out of a normal position relative to the nozzle beam, and this relative movement is detected by a sensor assembly. The sensor assembly then provides a control signal so that the movement of the nozzle beam can be stopped before a collision of the nozzle beam with the obstacle occurs.

As the protective body surrounds the nozzle beam in the circumferential direction to such an extent that only an outlet opening remains free for the cleaning liquid, it is ensured that obstacles of any kind, in particular, also vehicle parts permeable to radiation and also very narrow articles, for example, the handle of a shovel, can be reliably recognized in that they result in a relative movement of the protective body once the protective body movable relative to the nozzle beam strikes the obstacle.

The protective body extends along the nozzle beam, i.e., it runs transversely to the longitudinal direction of the vehicle and extends over the entire vehicle. Obstacles can, therefore, be recognized by the protective body not only at certain locations on the nozzle beam, but rather the obstacles are reliably recognized across the entire width of the vehicle. The protective body, therefore, forms a mechanical contact element which recognizes an obstacle as it inadmissibly approaches the nozzle beam. As a result of the relative movement of the protective body, a control signal is triggered, under the effect of which the movement of the nozzle beam can be stopped and preferably reversed. The nozzle beam can get out of the way of the obstacle on time before it strikes the nozzle beam.

In order that the cleaning liquid emitted by the high-pressure nozzles can be directed toward the vehicle in different directions, the nozzle beam is preferably pivotable together with the protective body about a horizontal pivot axis. This makes it possible, for example, to pivot the nozzle beam in the area of a windshield of the vehicle to be cleaned so that the cleaning liquid can be directed at an incline to the vertical.

It is advantageous for the protective body to be of hollow-cylindrical configuration and for the nozzle beam to extend through the protective body. In particular, a circular-cylindrical configuration of the protective body has proven advantageous. The cylinder axis of the protective body preferably extends collinearly to a pivot axis of the nozzle beam.

In an advantageous embodiment of the invention, the protective body comprises a protective covering surrounding the nozzle beam completely in the circumferential direction with the exception of the at least one outlet opening. The protective covering may, for example, form the lateral surface of a hollow cylinder which surrounds the nozzle beam.

It is expedient for the protective covering to be produced from a flat material, in particular, from a rigid flat material. It may, for example, be provided that the protective covering is formed from a fine-meshed lattice material. The mesh size is preferably 5 mm at most, in particular, 3 mm at most. It is particularly advantageous for the protective covering to be produced from a closed flat material as this ensures that very narrow obstacles also result in movement of the protective body relative to the nozzle beam when they strike the protective covering.

The protective covering is preferably produced from a plastic material. This has the advantage that the protective body has a very low weight and, therefore, reliably executes a movement relative to the nozzle beam upon striking an obstacle. As previously mentioned, the relative movement can be detected by a sensor assembly in order to provide a control signal, under the effect of which the movement of the nozzle beam can be stopped.

The protective body expediently comprises a support structure to which the protective covering is fixed. The support structure may be of skeleton-like configuration and form a strutting which imparts a high mechanical stability to the protective body and also ensures that the protective body will practically not become deformed but rather execute a movement relative to the nozzle beam upon striking an obstacle.

In an advantageous embodiment of the invention, the support structure of the protective body comprises at least two rigid support rings which surround the nozzle beam completely in the circumferential direction and which are rigidly connected to each other by connector struts. It may, for example, be provided that the protective body is constructed in the manner of a hollow cylinder which has a support ring closed within itself at each of its end faces. A high mechanical stability is imparted to the protective body by the two support rings which are rigidly connected to each other by connector struts, and, at the same time, the weight of the protective body can be kept very low.

It is expedient for the connector struts to be aligned parallel to the pivot axis of the nozzle beam.

It is advantageous for the at least one outlet opening to be arranged between two connector struts aligned parallel to each other. In this case, the two connector struts can define the rim of the outlet opening.

As mentioned at the outset, the nozzle beam is held on the two stands so as to be adjustable in height and preferably so as to be pivotable about a pivot axis. For this purpose, a guide assembly, which is adjustable along the stand and on which the nozzle beam is held, may be provided on each stand. It is expedient for the protective body to rest loosely in the normal position on at least two support parts which are each fixed to a guide assembly of the nozzle beam. In such a configuration of the invention, the two guide assemblies which are adjustable along the stands not only accommodate the nozzle beam between them but also additionally serve to fix at least one support part each. The protective body rests loosely on the support parts. It can thereby be adjusted in its height together with the nozzle beam by the guide assemblies. If the protective body strikes an obstacle, it can move relative to the nozzle beam. When a pivotable nozzle beam is used, the protective body resting loosely on the support parts can be pivoted together with the nozzle beam about its pivot axis.

It is preferable for a guide rail along which the guide assemblies are displaceable in the vertical direction to be fixed to each of the stands.

Two support parts on which the protective body rests loosely are advantageously held on each guide assembly. The two support parts can be arranged at the same height at a distance from each other and support the protective body in the vertical direction. In its normal position, the protective body rests in the area of each stand on two support parts which like the nozzle beam are fixed to a guide assembly. If the protective body strikes an obstacle, it is moved by the obstacle relative to the nozzle beam, and it can move away from at least one support part as it is now supported by the obstacle. When the protective body subsequently moves away from the obstacle together with the nozzle beam, its weight force then causes it to again assume its original normal position in which it rests loosely on the support parts.

The support parts are preferably constructed as support rollers which are rotatable about axes of rotation aligned parallel to the pivot axis of the nozzle beam. This reduces frictional forces when the protective body is pivoted together with the nozzle beam as the protective body can roll on the support rollers during a pivotal movement.

When an obstacle is struck, the protective body moves relative to the nozzle beam. The relative movement is detected by a sensor assembly.

In an advantageous configuration, the sensor assembly comprises at least one proximity switch. A change in the position of the protective body relative to the nozzle beam can be reliably recognized by means of such proximity switches. In particular, non-contact proximity switches are advantageous, for example, inductive, capacitive, magnetic or electromagnetic proximity switches.

In a preferred configuration, the at least one proximity switch interacts with at least one stop element which is movable by the protective body upon movement out of the normal position. In such an embodiment, movement of a stop element, which, in turn, is caused by movement of the protective body relative to the nozzle beam, is recognized by means of the proximity switch.

The stop element is advantageously held so as to be movable on the guide assembly of the nozzle beam. For example, it may be provided that the stop element is held so as to be pivotable or displaceable on the guide assembly. When the protective body is moved out of its normal position upon striking an obstacle, this also results in movement of the stop element, which is detected by the proximity switch which interacts directly or indirectly with the stop element.

The nozzle beam is expediently mounted for pivotal movement about a pivot axis on two guide assemblies, each of which is held so as to be adjustable in height on a stand. It is advantageous for at least one stop element which is movable by the protective body upon movement out of the normal position to be arranged on each guide assembly. In such an embodiment, the nozzle beam is positioned between two guide assemblies, and at least one stop element is arranged on each of the guide assemblies. If the protective body surrounding the nozzle beam in the circumferential direction strikes an obstacle, this results in movement of the protective body relative to the nozzle beam. This, in turn, has the consequence that at least one stop element changes its position relative to a proximity switch. The change in position is preferably recognized without contact by the proximity switch which thereupon provides a control signal, under the effect of which the movement of the nozzle beam can be stopped and/or reversed in order to avoid a collision with the obstacle.

Two stop elements which interact by way of a pivot mechanism with a proximity switch are preferably arranged on each guide assembly.

It may be provided that a single proximity switch having two stop elements associated with it is arranged on each guide assembly.

In a particularly preferred configuration, there is fixed to the nozzle beam at least one catch by way of which the nozzle beam is connected to the protective body. A pivotal movement of the nozzle beam can be transmitted by way of the catch to the protective body so that when the nozzle beam is pivoted, the protective body also executes a pivotal movement about the pivot axis of the nozzle beam and, therefore, the position of the at least one outlet opening of the protective body relative to the high-pressure nozzles is also maintained upon pivotal movement of the nozzle beam.

To enable movement of the protective body relative to the nozzle beam when an obstacle is struck, it is advantageous for the protective body to be movable relative to the catch upon striking an obstacle. In particular, it may be provided that the catch is constructed as a catch bar which is aligned radially in relation to the pivot axis of the nozzle beam and passes through a catch opening arranged on the protective body. This makes it possible to move the protective body along the catch bar when an obstacle is struck.

The following description of a preferred embodiment of the invention will serve in conjunction with the drawings for further explanation.

DETAILED DESCRIPTION OF THE INVENTION

Figure 1:
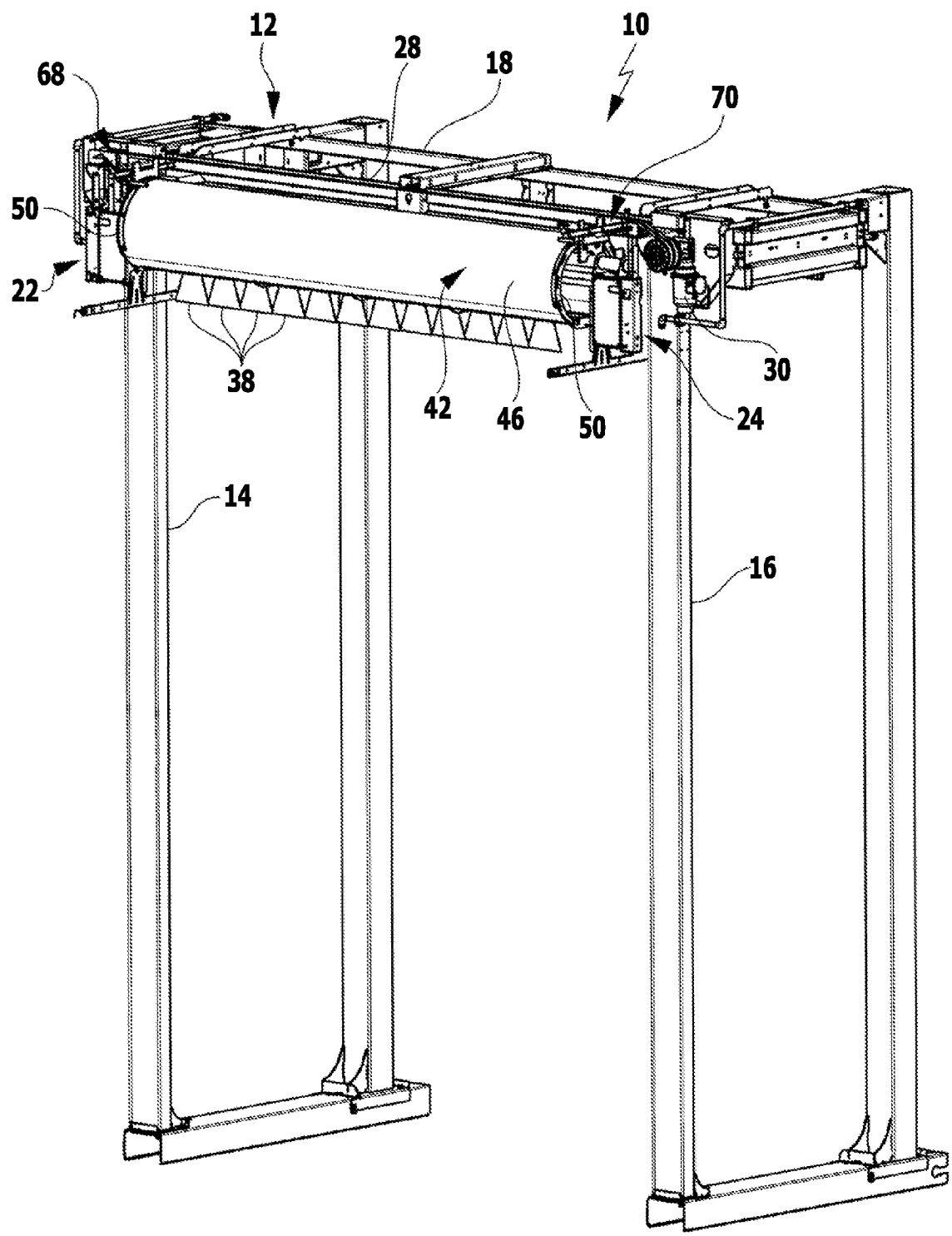
FIG. 1 a perspective representation of a vehicle washing installation in accordance with the invention.
Figure 2:
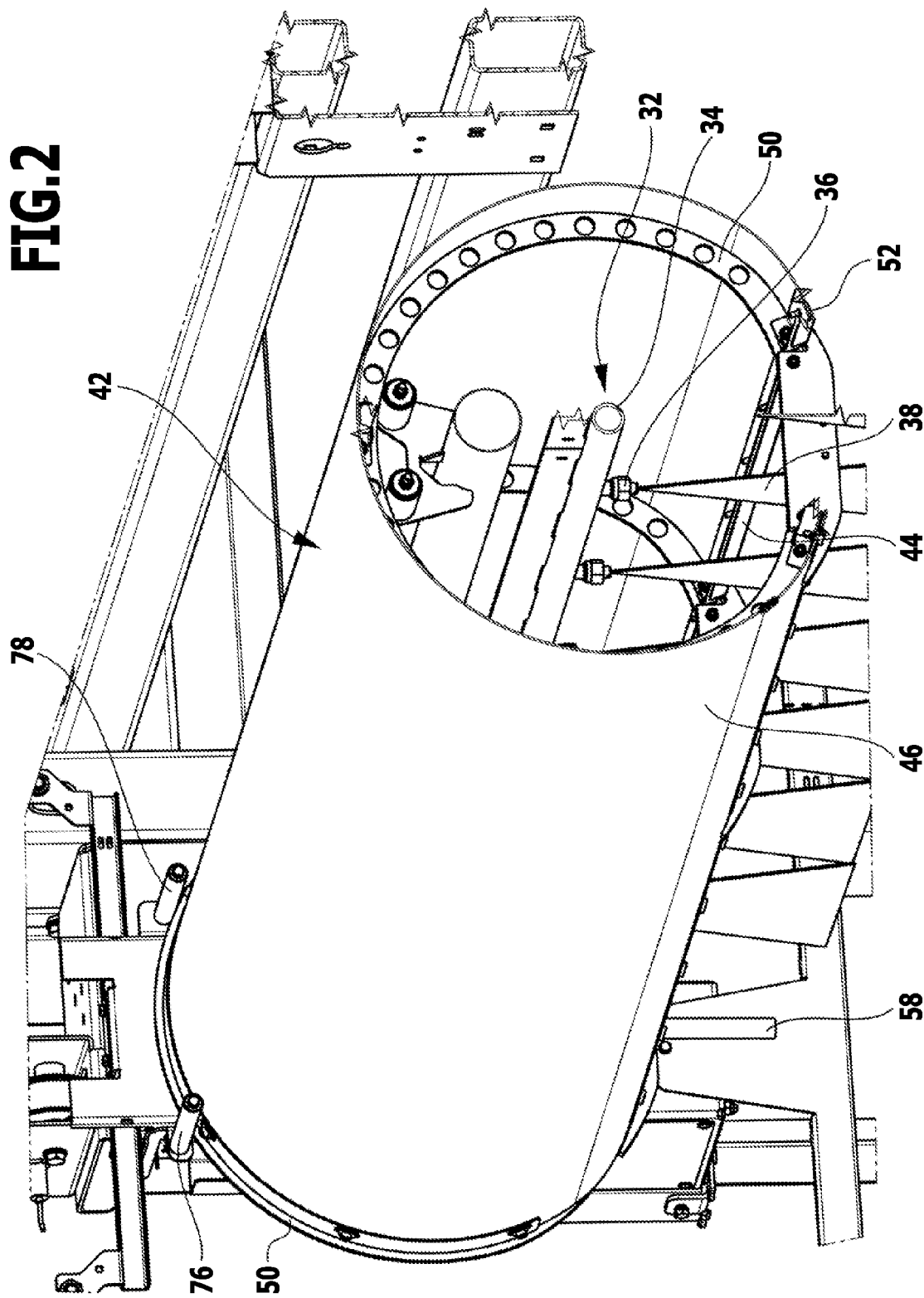
FIG. 2 a perspective representation, partly cut open, of a nozzle beam, surrounded by a protective body, of the vehicle washing installation from FIG. 1, wherein the protective body assumes a normal position.

A vehicle washing installation 10 in accordance with the invention with a gantry 12 comprising two vertically aligned stands 14, 16 connected to each other by a horizontally aligned crossbar 18 is shown schematically in FIG. 1. Fixed to each of the stands 14, 16 is a guide rail 20 on which a guide assembly 22 and 24, respectively, is held for displacement in the vertical direction. The two guide assemblies 22, 24 are coupled to each other by a horizontally extending coupling rod 26, so that they can be moved synchronously along the guide rails 20 of the two stands 14, 16. For adjustment of their height, the guide assemblies 22, 24 are connected by carrying means 28, for example, by a carrying belt, to a drive motor 30. The drive motor 30 is positioned at the upper end of the stand 16 and is in electrical connection with a control device, known per se, not shown in the drawings, of the vehicle washing installation 10.

The two guide assemblies 22, 24 have mounted between them a nozzle beam 32 with a pipeline 34 on which a plurality of high-pressure nozzles 36 are arranged equidistantly from one another. In the embodiment shown, the high-pressure nozzles 36 are constructed as flat jet nozzles. The high-pressure nozzles 36 can be acted upon with cleaning liquid under pressure, in particular, with water, by way of the pipeline 34, so that they each emit a jet of cleaning liquid 38. The jet of cleaning liquid 38 can be directed toward a vehicle to be cleaned, which can be positioned between the two stands 14, 16. To clean the vehicle, the gantry 12 can be moved in the known manner relative to the vehicle, and the nozzle beam 32 can be moved by the guide assemblies 22, 24 along the stands 14, 16 in accordance with the contour of the vehicle.

The nozzle beam 32 is held on the guide assemblies 22, 24 for pivotal movement about its longitudinal axis 40. This makes it possible to emit the jets of cleaning liquid 38 in different directions. In FIGS. 1 to 5, the nozzle beam 32 is shown in a pivotal position in which the jets of cleaning liquid 38 are directed vertically downwards. In FIG. 6, the nozzle beam 32 is shown in a position pivoted through 90°, in which the jets of cleaning liquid 38 are horizontally aligned.

The nozzle beam 32 is surrounded in the circumferential direction by a hollow-cylindrical protective body 42 which completely surrounds the nozzle beam 32 as well as the coupling rod 26 except for an outlet opening 44. The outlet opening 44 is arranged in front of the high-pressure nozzles 36 in relation to the jets of cleaning liquid 38, so that the cleaning liquid emitted by the high-pressure nozzles 36 can exit from the protective body 42 in order to act upon a vehicle to be cleaned.

The protective body 42 comprises a protective covering 46 produced from a flat material and fixed to a support structure 48. The protective covering 46 forms a closed structure which, in the embodiment shown, is made of a plastic material.

Figure 3:
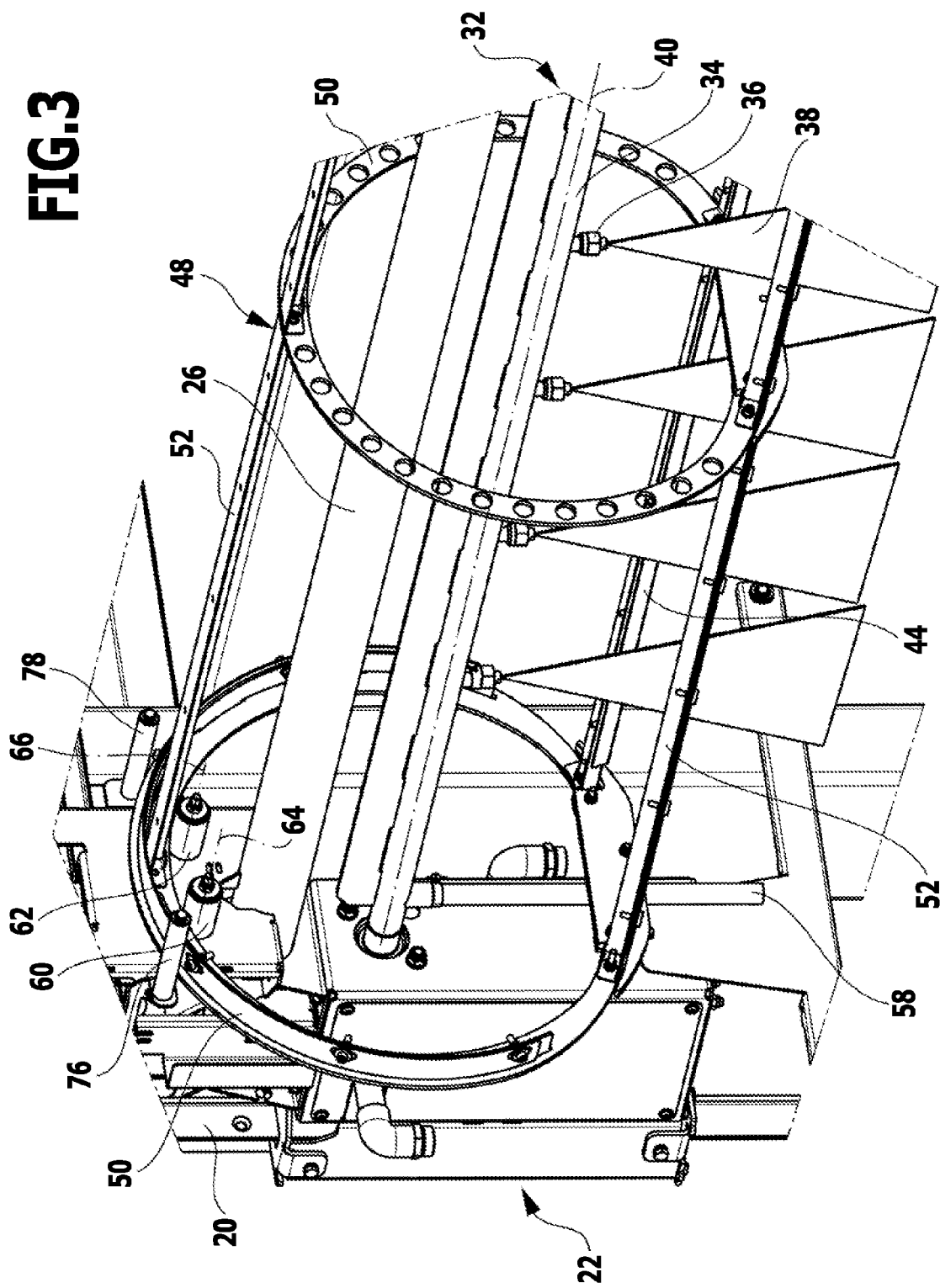
FIG. 3 a perspective representation of the nozzle beam, surrounded by the protective body, corresponding to FIG. 2, wherein a protective covering of the protective body has been faded out.
Figure 4:
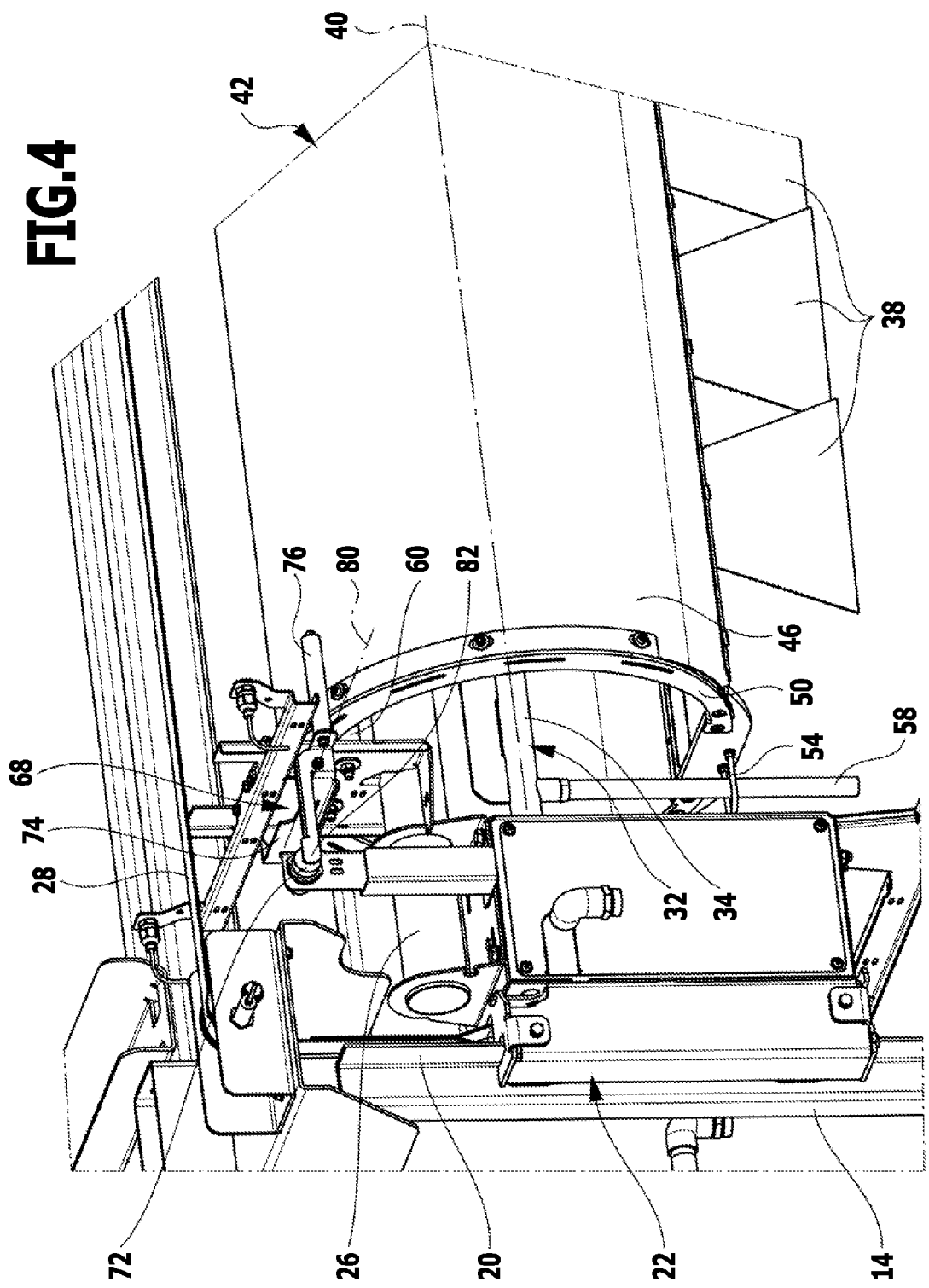
FIG. 4 a further perspective representation of the nozzle beam, surrounded by the protective body, of the vehicle washing installation from FIG. 1, wherein the protective body assumes a normal position.
Figure 5:
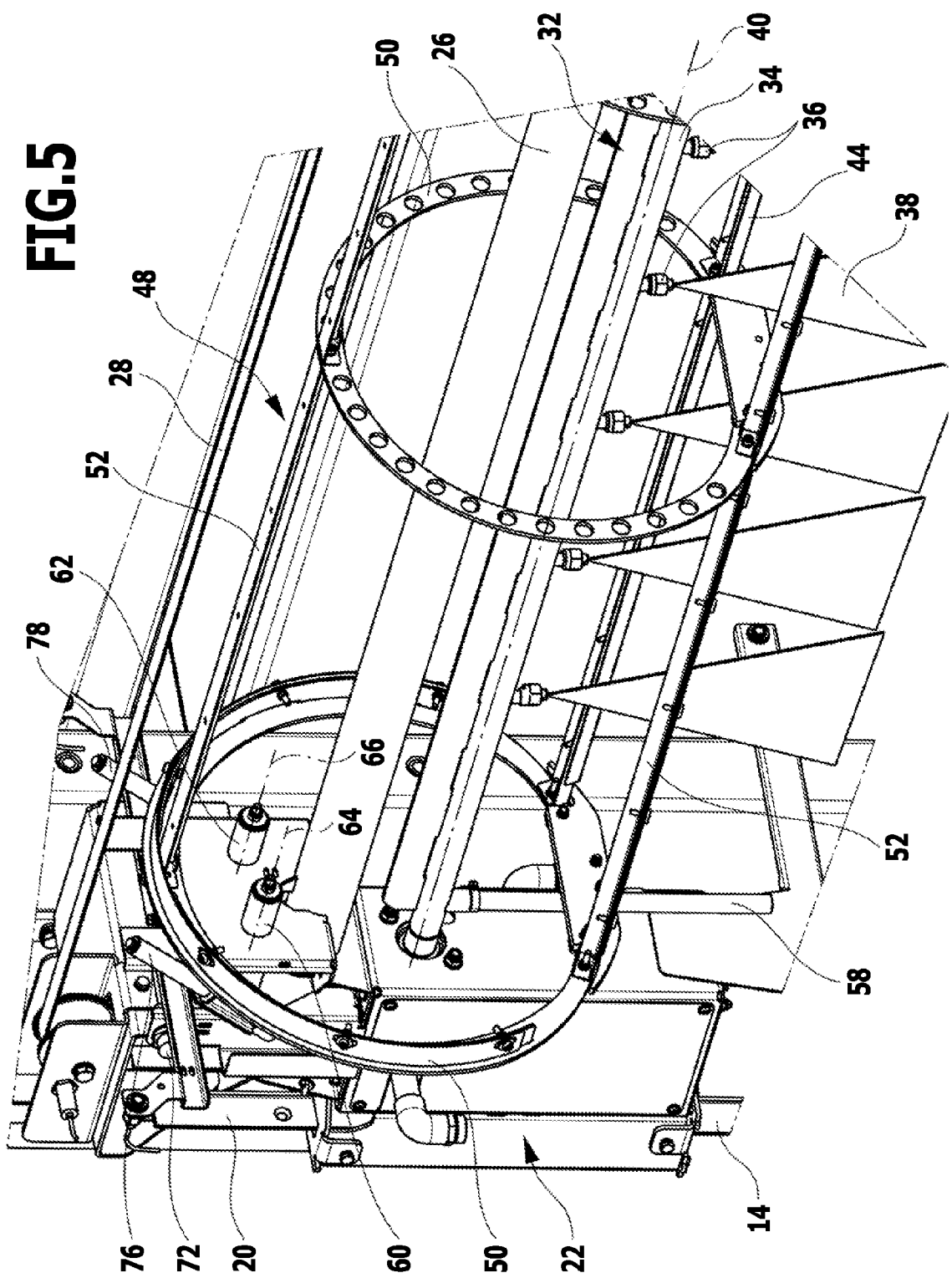
FIG. 5 a perspective representation of the nozzle beam, surrounded by the protective body, of the vehicle washing installation from FIG. 1, wherein a protective covering of the protective body has been faded out and the protective body assumes a position offset in relation to the nozzle beam.
Figure 6:
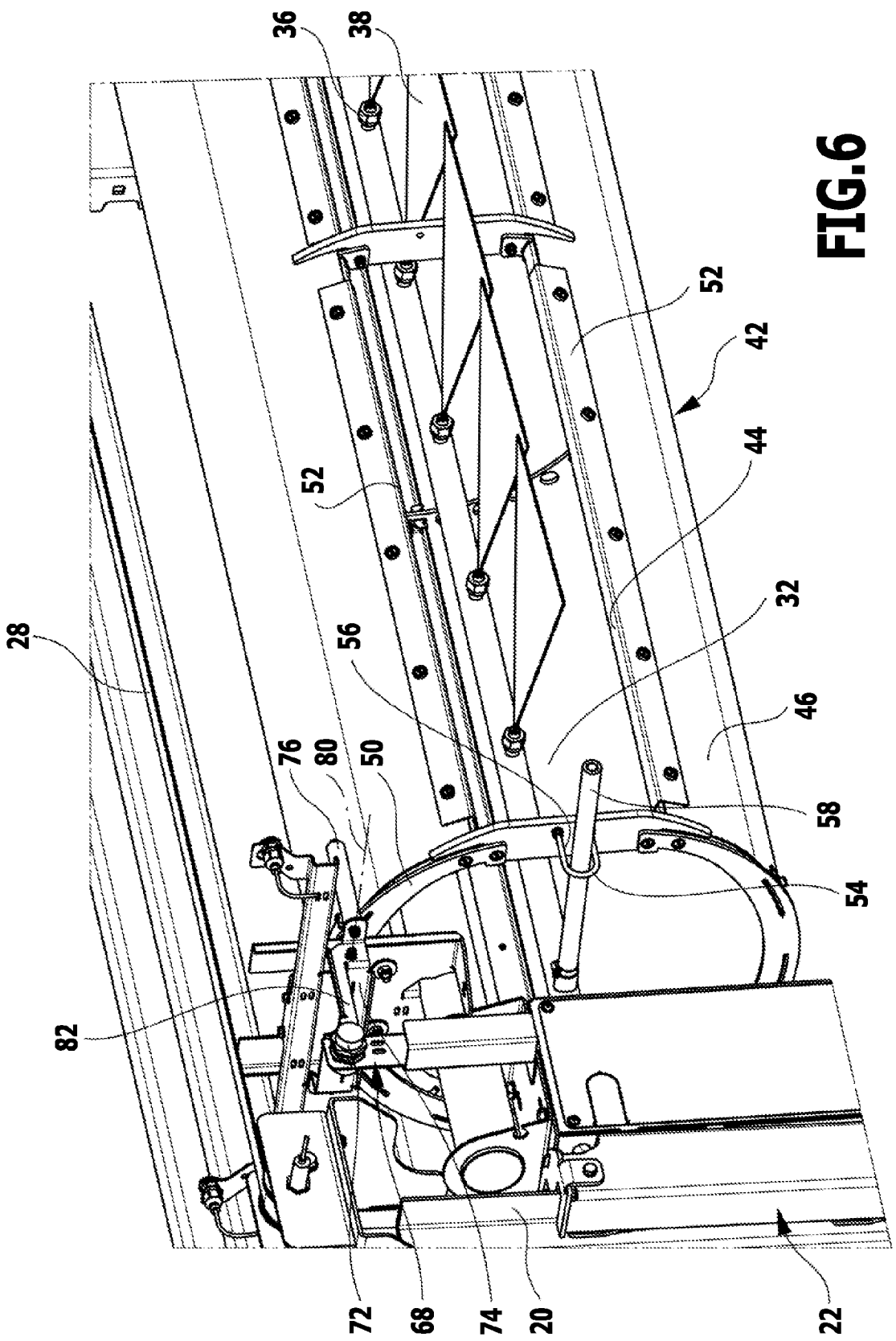
FIG. 6 a perspective representation of the nozzle beam, surrounded by the protective body, of the vehicle washing installation from FIG. 1, wherein the nozzle beam together with the protective body assumes a position pivoted through 90°.

As will be clear, in particular, from FIGS. 3 and 5, the support structure 48 comprises several support rings 50 closed within themselves, which are rigidly connected to one another by connector struts 52 aligned parallel to the longitudinal axis 40 of the nozzle beam 32. In combination with the connector struts 52, the support rings 50 impart a high mechanical stability to the support structure 48 and ensure that the protective body 42 has a high degree of stiffness and is practically unable to become deformed.

The support rings 50 are each arranged in a vertically aligned plane. In particular, the protective body 42 has a support ring 50 at each of its end faces that face the stands 14, 16. At the outer sides which each face a stand 14, 16, the end-face support rings 50 each carry a U-shaped catch bracket 54 which defines a catch opening 56. A catch bar 58 which is fixed to the nozzle beam 32 in radial alignment with the longitudinal axis 40 of the nozzle beam 32 passes through the catch opening 56. A pivotal movement of the nozzle beam 32 is transmitted by the catch bar 58 to the protective body 42.

When the nozzle beam 32 is pivoted about the longitudinal axis 40, the protective body 42 follows this pivotal movement, so that the outlet opening 44 assumes a constant position relative to the high-pressure nozzles 36. This will be clear, in particular, from a comparison of FIGS. 4 and 6.

The protective body 42 is supported in the vertical direction on each guide assembly 22, 24 by means of two support elements configured in the form of support rollers 60, 62. The support rollers are freely rotatable about axes of rotation 64 and 66, respectively, aligned parallel to the longitudinal axis 40, and are adjustable in height together with the nozzle beam 32. The support rollers 60, 62 extend into the end-face support rings 50 of the support structure 48 and so the protective body 42 rests loosely on the support rollers 60, 62. When the protective body 42 is pivoted together with the nozzle beam 32 about the longitudinal axis 40, the end-face support rings 50 of the support structure 48 roll on the support rollers 60, 62.

If, during the cleaning of a vehicle, the protective body 42 strikes an obstacle, for example, a vehicle body, it can execute a movement relative to the nozzle beam 32, whereby it can lift off from at least one support roller 60, 62. To detect a movement of the protective body 42 relative to the nozzle beam 32, the vehicle washing installation 10 comprises two sensor assemblies 68, 70 of identical configuration which are each positioned on a guide assembly 22 and 24, respectively. The sensor assemblies 68, 70 each comprise a proximity switch 72 which is coupled by a pivot mechanism 74 to a first stop element 76 and a second stop element 78. The two stop elements 76, 78 are of pin-shaped construction and are aligned parallel to the longitudinal axis 40 of the nozzle beam 32. From their position of rest shown in FIGS. 2, 3, 4 and 6, the stop elements 76, 78 can be pivoted counter to the resetting force of a spring about a pivot axis 80 of the pivot mechanism 74, which is aligned horizontally and perpendicularly to the longitudinal axis 40. The pivot mechanism 74 comprises a pivot lever 82 which is rigidly connected to the stop elements 76, 78. In the position of rest of the stop elements 76, 78, the pivot lever 82 assumes a horizontally aligned position in which it is arranged with its free end directly in front of the proximity switch 72. Upon pivotal movement of the stop elements 76, 78, the pivot lever 82 changes its position relative to the proximity switch 72. The change in position of the pivot lever 82 is recognized by the proximity switch 72, which thereupon provides a control signal which is made available to the control device, not shown in the drawings, of the vehicle washing installation 10.

If, during the cleaning of a vehicle, the nozzle beam 32 approaches an obstacle, for example, a vehicle body or a tool protruding from the vehicle, which has been inadvertently left on the vehicle, the protective body 42 strikes the obstacle before the nozzle beam 32 can reach the obstacle. The consequence of the protective body striking the obstacle is that the protective body is moved relative to the nozzle beam 32. This, in turn, results in at least one stop element 76, 78 being pivoted about the pivot axis 80 and in the pivot lever 82 thereby changing its position relative to the proximity switch 72. This change in position is detected by the proximity switch 72 which thereupon makes a control signal available to the control device of the vehicle washing installation 10. This results in the movement of the nozzle beam 32 and, therefore, also the movement of the protective body 42 first being stopped and then being reversed, so that the nozzle beam 32 moves together with the protective body 42 away from the obstacle. As it recedes from the obstacle, the protective body 42, owing to its weight force, returns to its normal position in which it rests loosely on the support rollers 60, 62.

A collision of the nozzle beam 32 with an obstacle during the cleaning of a vehicle can, therefore, be reliably prevented by the protective body 42, more particularly, also when the obstacle is permeable to radiation, in particular, permeable to light and/or has very narrow dimensions. The full-surface configuration of the protective covering 46 ensures that very narrow obstacles can also be reliably recognized and result in movement of the protective body 42 relative to the nozzle beam 32, which is detected by at least one sensor assembly 68, 70. After relative movement has taken place, the protective body 32, as it recedes from the obstacle, automatically assumes its normal position again without a resetting device being required for this. In particular, a return spring may be dispensed with. This has the advantage that the protective body 42 is not acted upon by a spring force in its normal position and is, therefore, also moved relative to the nozzle beam under the action of very low forces that are exerted by an obstacle on the protective body 42 during a collision.

That which is claimed:

1. A vehicle washing installation having two stands on which a nozzle beam with a plurality of high-pressure nozzles is held so as to be adjustable in height, wherein the nozzle beam is surrounded by a protective body extending along the nozzle beam and having at least one outlet opening for cleaning liquid, the protective body being adjustable in height together with the nozzle beam and being movable out of a normal position relative to the nozzle beam upon striking an obstacle, the movement of the protective body relative to the nozzle beam being detectable by at least one sensor assembly in order to provide a control signal.

2. The vehicle washing installation in accordance with claim 1, wherein the protective body is pivotable together with the nozzle beam about a horizontal pivot axis.

3. The vehicle washing installation in accordance with claim 1, wherein the protective body is of hollow-cylindrical configuration and the nozzle beam extends through the protective body.

4. The vehicle washing installation in accordance with claim 1, wherein the protective body comprises a protective covering surrounding the nozzle beam completely in the circumferential direction with the exception of the at least one outlet opening.

5. The vehicle washing installation in accordance with claim 4, wherein the protective covering is produced from a flat material.

6. The vehicle washing installation in accordance with claim 4, wherein the protective body comprises a support structure to which the protective covering is fixed.

7. The vehicle washing installation in accordance with claim 6, wherein the support structure comprises at least two rigid support rings which surround the nozzle beam completely in the circumferential direction and which are rigidly connected to each other by connector struts.

8. The vehicle washing installation in accordance with claim 1, wherein the nozzle beam is mounted for pivotal movement about a pivot axis on two guide assemblies, each of which is held so as to be adjustable in height on a stand, and wherein the protective body rests loosely in its normal position on at least two support parts which are each fixed to a guide assembly.

9. The vehicle washing installation in accordance with claim 8, wherein two support parts on which the protective body rests loosely are held on each guide assembly.

10. The vehicle washing installation in accordance with claim 8, wherein the support parts are configured as support rollers which are rotatable about an axis of rotation aligned parallel to the pivot axis of the nozzle beam.

11. The vehicle washing installation in accordance with claim 1, wherein the at least one sensor assembly comprises at least one proximity switch.

12. The vehicle washing installation in accordance with claim 11, wherein the proximity switch interacts with at least one stop element which is movable by the protective body upon movement out of the normal position.

13. The vehicle washing installation in accordance with claim 12, wherein the nozzle beam is mounted for pivotal movement about a pivot axis on two guide assemblies, each of which is held so as to be adjustable in height on a stand, and wherein at least one stop element which is movable by the protective body upon movement out of the normal position is arranged on each guide assembly.

14. The vehicle washing installation in accordance with claim 13, wherein two stop elements which interact by way of a pivot mechanism with a proximity switch are arranged on each guide assembly.

15. The vehicle washing installation in accordance with claim 1, wherein the protective body is coupled by way of at least one catch to the nozzle beam, the at least one catch being fixed to the nozzle beam.

16. The vehicle washing installation in accordance with claim 15, wherein the catch is configured as a catch bar which is aligned radially in relation to the pivot axis of the nozzle beam and passes through a catch opening arranged on the protective body.

* * * * *